(12) United States Patent
Kowalski et al.

(10) Patent No.: US 10,394,597 B1
(45) Date of Patent: Aug. 27, 2019

(54) FLEXIBLE BATCH JOB SCHEDULING IN VIRTUALIZATION ENVIRONMENTS

(71) Applicant: Amazon Technologies, Inc., Reno, NV (US)

(72) Inventors: Marcin Piotr Kowalski, Western Cape (ZA); Wesley Gavin King, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 746 days.

(21) Appl. No.: 14/034,341

(22) Filed: Sep. 23, 2013

(51) Int. Cl.
*G06F 9/46* (2006.01)
*G06F 9/50* (2006.01)
*G06F 9/455* (2018.01)

(52) U.S. Cl.
CPC ............. *G06F 9/46* (2013.01); *G06F 9/50* (2013.01); *G06F 9/455* (2013.01)

(58) Field of Classification Search
CPC .............. G06F 9/46; G06F 9/50; G06F 9/455
See application file for complete search history.

(56) References Cited

U.S. PATENT DOCUMENTS

| | | | |
|---|---|---|---|
| 6,032,172 A | 2/2000 | Kutcher | |
| 6,182,055 B1* | 1/2001 | Kase | G06N 5/00 706/10 |
| 6,622,221 B1* | 9/2003 | Zahavi | G06F 3/0601 703/2 |
| 7,661,015 B2 | 2/2010 | Revanuru et al. | |
| 8,234,643 B2 | 7/2012 | Neichev | |
| 8,412,822 B1* | 4/2013 | Weinman, Jr. | G06F 9/5027 709/201 |
| 2003/0120701 A1* | 6/2003 | Pulsipher | G06F 9/4843 718/102 |
| 2005/0015767 A1* | 1/2005 | Nash | G06F 9/4887 718/102 |
| 2007/0022425 A1* | 1/2007 | Jackson | G06F 9/5027 718/104 |
| 2008/0120619 A1* | 5/2008 | Podila | G06Q 10/10 718/102 |

(Continued)

FOREIGN PATENT DOCUMENTS

EP 2437169 4/2012

OTHER PUBLICATIONS

Sathiya Moorthy "Cron Vs Anacron: How to Setup Anacron on Linux (With an Example)" Published May 10, 2011, downloaded from www.thegeekstuff.com/2011/05/anacron-examples/ Aug. 12, 2013, pp. 1-8.

(Continued)

*Primary Examiner* — Benjamin C Wu
(74) *Attorney, Agent, or Firm* — Robert C. Kowert; Meyertons, Hood, Kivlin, Kowert & Goetzel, P.C.

(57) ABSTRACT

Methods and apparatus for flexible batch job scheduling in virtualization environments are disclosed. A descriptor for a batch job requested by a client is received at a job scheduling service. The descriptor comprises an indication of a time range during which a job iteration may be performed. A target time for executing the iteration is determined based on an analysis of a plurality of received descriptors. An indication of the target time at which the iteration is to be scheduled is provided to a selected execution platform.

22 Claims, 9 Drawing Sheets

(56) References Cited

U.S. PATENT DOCUMENTS

| | | | | |
|---|---|---|---|---|
| 2008/0184248 A1* | 7/2008 | Barua | ............... | G06F 9/4843 718/104 |
| 2008/0294769 A1* | 11/2008 | Doi | ............... | G06F 9/4843 709/224 |
| 2009/0282404 A1* | 11/2009 | Khandekar | ......... | G06F 9/45558 718/1 |
| 2013/0111497 A1 | 5/2013 | Chen et al. | | |

OTHER PUBLICATIONS

U.S. Appl. No. 61/738,967, filed Dec. 18, 2012, Kathryn Shih, et al.
U.S. Appl. No. 13/764,716, filed Feb. 11, 2013, Kathryn Marie Shih, et al.
U.S. Appl. No. 13/942,618, filed Jul. 15, 2013, Carl Bellingan.
U.S. Appl. No. 13/764,711, filed Feb. 11, 2013, Kathryn Marie Shih, et al.

* cited by examiner https://<websitename>/scheduled.JobConsole/jobListView

Dear John Doe, welcome to the job console!

Here is a list of your scheduled jobs. Click here to add a new job. Click here to filter the job list. ← 402

| Job name | Description | Targeted instance(s) | Nominal frequency | Nominal next start | Next sched. start time | Most recent result | Latest output ← 406 | Descriptor details |
|---|---|---|---|---|---|---|---|---|
| Rotate WSLog | Rotate web server log | WSInst-004(AZ-002) | Once every 240 minutes | 14:00:00.000 EDT 09/02/13 | 13:37:01.520 EDT 09/02/13 | Success (exit code 0), 09:45 09/01/13 | Click here to see log ← 410 | Click here to see/edit details ← 414 |
| Cleanup-app1 | Remove old app1 output files | App1Inst-002(AZ-002) | Once every 24 hours | 02:00:00.000 EDT 09/02/13 | 01:42:08.906 EDT 09/02/13 | Success (exit code 0), 01:45 EDT 09/01/13 | Click here to see log | Click here to see/edit details ← 418 |
| Collect-account-info | Get account status | Any (unbound) | Once every 24 hours | 04:00:00.000 EDT 09/02/13 | 05:42:34.334 EDT 09/02/13 | Success (exit code 0), 02:36 EDT 09/01/13 | Click here to see log | Click here to see/edit details |
| ... | | | | | | | | |

FLEXIBLE BATCH JOB SCHEDULING IN VIRTUALIZATION ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Although the use of virtualization technologies has resulted in many advantages, the facts that many different virtual machines or compute instances are often implemented using the same physical resources, and that hundreds or thousands of such instances may be co-located within a single data center, may also have some potential negative side effects. One such problem may result from inadvertent timing coincidences associated with batch jobs (e.g., administrative scripts typically run without user interaction) scheduled at the instances. For example, many operating systems support scheduled batch job scheduling, e.g., using variants of the "cron" utility, which allows users to specify the times at which iterations of various tasks are to be repeated. Many users of such utilities may happen to choose iteration execution times (e.g., at midnight every night for a task that is to be done once a day) that happen to match the iteration execution times chosen for other tasks and/or by other users at other instances, even though there may be no real need for all the tasks to be executed at the same time. Although any one batch job may not necessarily consume a lot of resources, contention for shared resources may rise due to hundreds or thousands of such jobs being scheduled at about the same time, and this may have a negative impact on other applications and on the batch jobs themselves.

BRIEF DESCRIPTION OF DRAWINGS

FIG. 4 illustrates an example of a programmatic interface providing a client with a consolidated view of batch jobs that may be scheduled at any of a plurality of execution platforms of a provider network, according to at least some embodiments.

Figure 1:
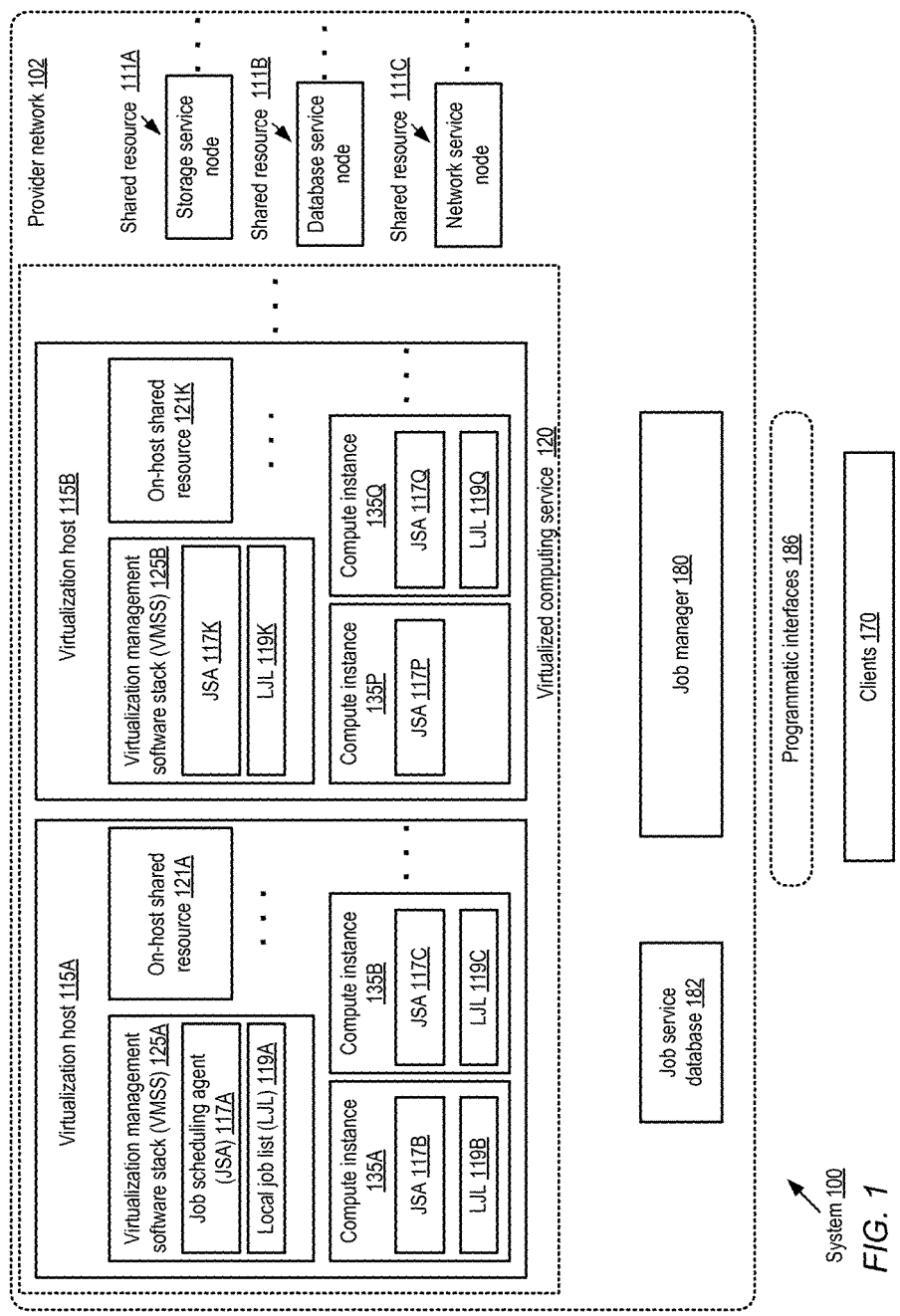
FIG. 1 illustrates an example of a system in which a centralized job scheduling service is implemented in a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a batch job scheduling service in a provider network environment are described. In at least some embodiments, the service may provide programmatic interfaces enabling clients to indicate acceptable levels of flexibility for initiating various jobs on behalf of the clients, such that the service is able to select the exact times at which various job iterations are begun. In one embodiment, the service may provide indications to the clients of the advantages and benefits of relaxing the scheduling requirements for various jobs. Such advantages may include, for example, potential improvements in application performance, as well as discounts or coupons that can be used to reduce the clients' billing amounts for using various services of the provider network. In some embodiments, the service may also allow clients to request the execution of "unbound" jobs—e.g., executable programs or scripts that are not tied to any specific execution platform but may be executed at a compatible platform chosen by the service, during a time range acceptable to the client. In addition, in various embodiments the job scheduling service may provide a client with a unified interactive view (e.g., via a single web-based console with filtering capabilities) of the jobs whose execution has been requested at resources allocated to the client, enabling the client to view and modify settings for jobs that could be scheduled on tens, hundreds, or even thousands of execution platforms in the provider network via a single easy-to-use interface.

Networks set up by an entity such as a company or a public sector organization to provide one or more network-accessible services (such as various types of cloud-based computing, storage or database services) reachable via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network.

A virtualized computing service may be implemented in a provider network in at least some embodiments, enabling a variety of client applications to run at virtual compute servers or "compute instances" instantiated on behalf of the clients. The compute instances may each comprise a virtual machine with its own operating system, and multiple such instances may be hosted on a given physical server or "virtualization host" at a provider network data center. Each virtualization host may include a respective virtualization management software stack (VMSS), including for example a hypervisor and/or an instance of an operating system dedicated to administering the compute instances running on the host.

In various embodiments, the compute instances and/or the VMSS may support batch job scheduling tools such as variants of the Unix™ "cron" utility or Windows "Task Scheduler" utility, either natively as part of the operating system, or in the form of installable applications. As used herein, the term "batch job" may refer to the iterations of one or more tasks accomplished by executing specified programs (such as shell scripts or other programs), typically without requiring user interactions for any given iteration. Such job scheduling tools may typically allow clients to specify, for a given executable script or program that is to be executed repeatedly on an ongoing basis, the frequency of execution and/or the start time for each iteration. For example, a respective entry may be added to a database or file (e.g., a "crontab" (cron table) file or its equivalent in the case of a cron-like utility) for each job, indicating the script/program to be executed and various details or rules regarding the timings of successive iterations, such as the day of the week, the month, the day of the month, the hour and/or the minute at which the iterations are to be run. Many different types of jobs may be scheduled, e.g., by administrators or by non-administrative users, such as jobs that rotate web server logs, discard or archive old output files, stop and restart applications, clear caches, check on the status of other applications or jobs, and so on. As operating systems and application stacks have grown more complex over time, the number of different types of batch jobs that are typically scheduled using such facilities on a given platform has also increased. Many administrative tasks associated with various local and/or distributed services, such as various types of health-monitoring and resource cleanup tasks, are often handled using batch job scheduling tools. It may often be the case that the users of such tools may choose fairly arbitrary times (such as "1 AM every day" for a job that is to be executed once a day), without being aware of other jobs that may also be scheduled at the same time and may also utilize some set of shared resources, and without being aware of other applications (not necessarily directly related to the scheduled jobs) that could also be running at the same time. Contention for shared resources (such as a CPU, a file system, or some logical resource such as a database object) may result in queueing and worse overall performance than if the scheduled jobs' start times were distributed more evenly over time. Some batch scheduling tools may offer only relatively coarse-grained control over scheduling times, e.g., at minute boundaries, which may also contribute to the problem of contention caused by overlapping job executions.

The problem of inadvertent temporal alignment (scheduling multiple jobs at the same time) may be even more significant in virtualization environments. A given virtualization host may include tens or dozens of compute instances, all sharing a common set of hardware resources, and a data center may include hundreds or thousands of virtualization hosts. Simultaneous or near-simultaneous instantiation of scheduled jobs at even a relatively small fraction of the instances may result in substantial spikes in the utilization levels or contention levels for various resources. In some cases, situations similar to the "thundering herd" problem may be encountered, in which a large number of threads of execution (or processes) are forced to sleep until a common resource becomes available, and then all the threads are awakened but only one is able to acquire the resource and proceed, once again forcing all but one of the threads to sleep. Such situations may sometimes lead to considerable wastage of resources such as processor cycles and memory.

For many types of jobs, coinciding scheduled start times may be largely unnecessary. For example, there may be no particular reason why jobs J1, J2, and J3, each of which have to be run once every day, all have to be started exactly at 12:01 AM, if their functionality may be equally successfully accomplished with start times of 11:50 PM, 12:05 AM, and 12:17 AM respectively, or even 10:05 PM, 12:07 AM, and 2:09 AM respectively. By spreading out the start times of such jobs even slightly, contention for various resources may be substantially reduced, smoothing out spikes in resource utilization levels, and thereby improving the performance characteristics of the scheduled jobs as well as other applications. The users or administrators on whose behalf the jobs are run may in many cases have no objections to allowing greater flexibility in scheduling at least a subset of the jobs, especially once they are made aware of the disadvantages of coinciding job executions.

Accordingly, in at least some embodiments, a job scheduling service may be implemented at a provider network to optimize, or at least attempt to reduce the resource contention associated with, the execution of batch job iterations. In one implementation, the service may implement one or more programmatic interfaces (such as web pages, application programming interfaces (APIs), command-line tools, or graphical user interfaces (GUIs)) that enable clients of the service to indicate respective scheduling descriptors associated with a plurality of jobs. A scheduling descriptor associated with a particular job may comprise an indication of a time range during which at least part of an iteration of the particular job is to be executed on behalf of the client. Using the service's interface(s), instead of specifying an exact time at which a job has to be begun, a client may be able to indicate more flexibility, e.g., by indicating an approximate frequency of execution and/or a nominal execution start time within an acceptable window of time. It is noted that in at least some embodiments, clients may continue to specify exact start times (with no flexible scheduling time range specified) for various jobs if they so desire. Thus, for those jobs for which a client wishes to retain control of exact start times, the service may not interfere with the client's scheduling settings. However, at least in some embodiments, because the job scheduling service may permit much finer-grained control over job start times (e.g., at the millisecond level rather than the minute level or the second level), the start times specified by clients may naturally lead to less job execution-time overlap, and hence to less resource contention, than if tools with coarser-grain time control were used.

A job manager component of the service may collect job descriptors for a plurality of jobs from a plurality of clients in some embodiments. The job manager may determine a target time at which to initiate an execution of an iteration of a given job, based at least in part on a temporal load distribution policy and/or on an analysis of a plurality of scheduling descriptors. In at least one embodiment, clients may programmatically provide hints or indications of the nature of the jobs, such as by indicating that a particular job is "CPU-intensive", "I/O-intensive" or "network-intensive", and such client-provided information may be used by the job scheduling service when determining which other job descriptors should be considered together with the particular job for scheduling decisions. Thus, the job manager may take a "big picture" view of the jobs to be scheduled at a variety of execution platforms, including the flexibility acceptable for the various jobs, the resources (if any) that are shared among at least a subset of the jobs, and so on, before deciding the start time for the iteration. One of the key responsibilities of the job manager in at least some embodiments may be to identify the subset of jobs that are to be considered together when making its scheduling decisions—e.g., such a subset may be selected based on common shared resources. In some cases the subset of jobs analyzed together may belong to (i.e., be executed on behalf of) more than one client, while in other cases, the group of jobs being analyzed may belong to a single client. The temporal load distribution policy may include various goals and/or constraints in different embodiments, for example, such as the targeted maximum number of jobs to be scheduled within any given five-minute interval, a targeted maximum utilization level for various shared resources, and so on. Any of several different types of resources may be shared among jobs and may therefore be contended for by jobs that execute in close temporal proximity, such as the processing resources (e.g., CPUs or cores) of virtualization hosts, storage devices (either local devices at a host, or network-accessible storage nodes of a storage service implemented in the provider network), network components/bandwidth, database objects, locks of various kinds, elements of the power or cooling infrastructure, or other resources or services accessible from the execution platforms at which the jobs are executed.

In various embodiments, the job scheduling service may manage job executions at a large number of execution platforms of the provider network, such as a collection of compute instances and/or virtualization management software stacks at numerous virtualization hosts. In at least some embodiments, at least a subset of the execution platforms may include a job scheduling agent (JSA) component of the service. After the job manager makes a decision about a start time for a particular iteration of a job, a job execution request or command indicating the start time may be sent to the JSA at a selected execution platform in such embodiments. In at least some embodiments, the JSA at a given execution platform may also (or instead) query or poll the job scheduling service to obtain information about jobs to be scheduled at that execution platform. Thus, in various embodiments, the transmission of various types of iteration scheduling information (including for example an indication of iteration start times) may be initiated by either the job manager, by the JSAs, or both the job manager and the JSAs. In some implementations, the start time may be specified with sub-second granularity, e.g., at millisecond granularity, in contrast to some scheduling mechanisms whose minimum timing granularity is minutes or seconds. Support for such fine-grained start times may enable a better temporal distribution of resource utilization than would be possible with coarser-grained start times. JSAs may typically communicate with the job manager via long-lasting secure connections in some implementations, so that the overhead of terminating and re-establishing connections can be amortized or reduced by using the same connection for interactions related to many different job iterations. In at least some implementations, a group of job execution requests may be bundled together and sent as a unit, e.g., to further reduce networking overhead associated with job scheduling.

The JSA may initiate the executable operations required for the iteration at the selected execution platform, in accordance with the target start time indicated in the job execution request. The JSA may collect result indicators (e.g., a result code or output) as well as various other metrics (such as total time taken, actual start time, actual end time, resource usage metrics and the like) of the job iteration in some embodiments, and transfer at least a subset of the collected metrics back to the job manager. In response to a status request from a client, an indication of the result indicators and/or at least some of the metrics associated with the iteration may be provided in some embodiments. In various embodiments, clients may be billed for the job iterations based on the actual amount of resources consumed for the iterations, and in at least one embodiment the billing amounts may be included in the metrics displayed to the clients. In at least one embodiment, the progress of the job iteration may be monitored as it executes, and real-time or near-real-time status updates may be provided to the clients. In some embodiments in which a traditional crontab-like file is maintained at the execution platforms, the local JSA at an execution platform may serve as an intermediary that collaborates with the job manager to implement the operations indicated in the crontab-like file, e.g., in a more flexible manner than may be indicated in the crontab entries. In such embodiments, the contents of the crontab-like file may be provided by the JSA to the job manager for inclusion in the job manager's collection or database of jobs.

In at least some embodiments, clients may be able to (or may be required to) provide the executable programs or scripts that are to be run on their behalf during job iterations, e.g., via some of the programmatic interfaces implemented by the service. For certain types of jobs, the specific execution platform (e.g., the particular instance used) may not necessarily be specified by the client; instead, the client may indicate a set of job iteration prerequisites in addition to the iteration scheduling requirements or rules. Client-specified prerequisites may include, for example, an operating system version, a requirement that a software program or programming environment be installed at or accessible from the execution platform, a requirement that some other program must have completed successfully prior to the start of the job iteration under consideration, specified performance capabilities of the execution platforms, and so on. Such jobs for which the client does not specify a particular target execution platform may be referred to as "unbound" jobs herein, in contrast to other jobs that are tied to specific compute instances or toed to other execution platforms, which may be referred to as "bound" jobs. For handling unbound jobs, in some embodiments the job scheduling service may establish a pool of resources. Specific execution platforms may be selected for unbound jobs as needed, based on analysis of the prerequisites specified for the jobs, their scheduling requirements, and the temporal load distribution policy in effect. In at least some embodiments, an unbound job may be executed at the same platform as one or more jobs that are bound to (i.e., scheduled explicitly for) the execution platform; thus, execution platforms need not be dedicated exclusively for only unbound jobs or only unbound jobs. The executable programs/scripts, prerequisites and/or other elements of the job descriptors may be stored in a job database or repository of the provider network in some embodiments. Prerequisites may also be specified for bound jobs in one embodiment.

In some embodiments, in addition to specifying the executable programs and the kinds of prerequisites/requirements discussed above, data sources and/or destinations (e.g., one or more directories or folders, or objects of a storage service implemented at the provider network) may also be specified for various jobs by the clients. In some embodiments, a client may be able to request that job iterations that are unable to complete successfully be re-scheduled by the service—e.g., the job scheduling service may be requested to respond to the result indicators, or to requests generated by the job iterations, by determining a replacement iteration start time if a given iteration does not complete successfully.

According to one embodiment, execution platforms and/or resources located outside the provider network, e.g., in a client data center or some other client facility, may also be brought under the purview of the job scheduling service. For example, a client C may have N compute instance allocated within the provider network for some set of applications, and may have set up M execution platforms for other applications in the client's own network outside the provider network. The job scheduling service may provide a common set of interfaces enabling batch job management, including flexible scheduling, at the combination of the N provider network instances and the M external platforms in such an embodiment. Job scheduling agents may be instantiated at the external execution platforms, and may interact with the job manager within the provider network using secure long-lasting network connections in at least some such embodiments. In at least some implementations, when making decisions about scheduling a given job iteration, the job scheduling service may be able to consider descriptors for a set of jobs that include some jobs targeted for execution at client premises, and other jobs targeted for execution within the provider network. It is noted that the techniques of flexible scheduling described herein largely in the context of execution platforms of a virtualized computing service may also be implemented for batch jobs associated with other services as well, such as batch jobs to be scheduled at storage service nodes or at components of a networking-related service.

Example System Environment

FIG. 1 illustrates an example of a system 100 in which a job scheduling service is implemented in a provider network, according to at least some embodiments. As shown, system 100 includes a provider network 102 in which a plurality of network-accessible services may be implemented, including for example a virtualized computing service 120, one or more storage services, one or more networking-related services, one or more database services and the like. The virtualized computing service 120 includes a plurality of virtualization hosts 115, such as hosts 115A and 115B in the depicted embodiment. Each virtualization host 115 may in turn include a virtualization management software stack (VMSS) 125, such as VMSS 125A on host 115A and VMSS 125B on host 115B, as well as one or more compute instances 135. As shown, host 115A includes instances 135A and 135B, while host 115B includes instances 135P and 135Q. Each of the instances 135 may comprise its own operating system, and may be used for various client applications. A VMSS may comprise various components, including for example a hypervisor and/or an operating system instance that is to be used for administrative purposes rather than for client application execution.

Batch jobs whose execution timing is managed by a job scheduling service (JSS) of the provider network may be executed at VMSSs 125 and/or at the compute instances 135 in the depicted embodiment. Accordingly, the VMSSs and the compute instances may collectively be referred to as execution platforms for the batch jobs. The job scheduling service may include a job manager 180, and may implement one or more programmatic interfaces 186 enabling clients 170 to specify various details regarding jobs and their scheduling requirements to the job scheduling service. In addition, the JSS may include local components called job scheduling agents (JSAs) at the execution platforms. In at least some embodiments, the virtual machine images used for at least some compute instances 135 may be pre-configured or pre-built to use the JSS. For example, when a client requests that a compute instance be launched using one of the provider network's supported set of machine images, by default, a JSA that is configured to communicate with the JSS (e.g., with a job manager 180) may be instantiated as one of the compute instance's default system processes or threads. In such embodiments where the job scheduling service feature is enabled by default, clients may not need to perform any additional actions to begin utilizing JSS functionality. In the example system illustrated in FIG. 1, each VMSS 125 and each instance 135 includes a respective job scheduling agent (JSA) 117, such as JSA 117A at VMSS 125A, JSA 117K at VMSS 125B, and JSAs 117B, 117C, 117P and 117Q at compute instances 135A, 135B, 135P and 135Q respectively. The JSAs at each of the various execution platforms may establish secure, typically long-lasting connections for interactions with the job manager 180 in the depicted embodiment. Information regarding job descriptors (including, for example, the names of the executable programs or scripts involved, or the actual executable programs/scripts themselves), temporal load distribution policies that may be applied to various categories of jobs, and various metrics collected for job iterations may be stored in job service database 182 in the depicted embodiment. It is noted that although the job manager 180 is shown as a single entity in FIG. 1, the functionality of the job manager may be implemented collectively by a plurality of hardware and/or software components in various embodiments. Furthermore, although each execution platform is shown with its own JSA in FIG. 1, in some embodiments a given JSA may be configured to handle local job-related operations at a plurality of execution platforms.

The programmatic interfaces 186, which may for example include one or more web-based interfaces or consoles, graphical user interfaces, APIs, or command-line tools, may enable clients 170 to specify job descriptor elements to the JSS. Job descriptor elements may include, for example, client-specified job names, descriptions, executable programs, prerequisites such as software or hardware requirements, data sources and/or destinations, as well as scheduling information such as the desired frequency of job iterations, the desired default start times, and the extent of the flexibility (e.g., time ranges) granted to the JSS with respect to iteration start times. In at least some implementations, a job descriptor may include indications of resource usage (such as whether the client considers a job CPU-intensive, I/O-intensive or network-intensive), which may be useful to the job manager when selecting groups of jobs to be considered together for scheduling decisions, and/or to select the scheduling of a particular job iteration. Each execution platform may be expected to implement a plurality of jobs, at least some subset of which may rely on shared resources. The shared resources utilized or accessed for executing various types of jobs may include local, on-host resources such as resource 121A (e.g., a local processing element such as a core or a CPU, local memory, a local storage device such as a disk, or a local logical resource such as a lock) at host 115A and resource 121K at host 115B. Some jobs may also rely on external (i.e., off-host) shared resources 111 corresponding to nodes of various other services of the provider network, such as node 111A of a storage service, node 111B of a database service, or node 111C of a network service. For example, in one scenario a plurality of batch jobs to be scheduled at instances 135A, 135B, 135P and 135Q may all read and/or write the same database object, or may need to transfer data over the same set of network links.

In the embodiment shown in FIG. 1, some of the execution platforms may include a respective local job list (LJL) 119, such as LJLs 119A, 119B, 119C, 119K and 119Q. Local job lists may be used for any of several purposes in different embodiments. A local job list may represent the logical equivalent of a crontab file, in which entries or descriptors for jobs that have to be executed on the local platform may be entered by clients or administrators. Thus, in some embodiments, clients may be able to use either the programmatic interfaces 186 to specify batch jobs, or they may be able to add entries to the LJLs at the execution platforms. Not all execution platforms (some of which may implement different operating systems at their virtual machines than others) need necessarily include the same types of LJLs, or need even support LJLs in various embodiments. For example, in FIG. 1, compute instance 135P does not include an LJL. In some implementations, an LJL entry may include a field allowing a client to specify the flexibility associated with scheduling the corresponding job's iterations. According to some embodiments, the LJLs may be used by the JSAs to store representations of the job execution requests sent by the job manager, including the start times for job iterations determined by the job manager as described below. In other embodiments, LJLs may not include flexible timing ranges; instead, the information entered into LJLs may be incorporated into the job service database 182 by the job manager 180, and additional fields related to scheduling flexibility may be added by the job manager within its own database 182.

The job manager 180 may be configured to collect job descriptor elements, e.g., received via interfaces 186 and/or derived from LJLs 119 modified by clients, and analyze selected groups of the job descriptors to determine the actual execution times for various job iterations. The job groups may be determined based on various factors in different embodiments: for example, all the jobs that require the use of a given host's CPUs, have no prerequisites or a common set of prerequisites or requirements (such as a particular version of an operating system), and are nominally expected to be executed within a two-hour time window of each other, may be selected as members of one group. The job manager may determine specific start times for the members of the job group, e.g., at a fine granularity such as millisecond-level granularity, in accordance with a set of temporal load balancing goals or policies. The policies may specify, for example, desired maximum utilization levels of the resources used by the jobs, desired maximum impacts on other applications' response times, target limits on the number of concurrently-executing jobs, and the like.

The job manager 180 may then transmit respective job execution requests to the JSAs at the execution platforms at which the jobs are to be executed in the depicted embodiment. In some implementations, JSAs may poll the job manager instead or in addition to receiving job execution requests sent by the job manager. For unbound jobs (i.e., jobs for which no specific execution platform has been specified), the job manager 180 may select the execution platforms, e.g., based on prerequisites of the job, measured or expected utilization levels of the execution platform's resources or other shared resources, and so on. The JSAs may initiate the job iterations, e.g., by invoking the script or executable program indicated in the job's descriptor or LJL entry. Results of the iterations may be collected by the JSAs, as well as other metrics such as the actual start and stop times, resource utilization levels during the iterations, and the like. In one implementation, instead of or in addition to storing crontab-like entries specified by clients, LJLs 119 may be used to store representations of the job execution requests sent to the JSAs by the job manager 180. The results and/or metrics may be provided to clients, e.g., either via the programmatic interfaces 186 or via files or other interfaces on the execution platforms. In some embodiments, the clients may be able to view the billing amounts for various job iterations, which may have been generated based at least in part on the measured resource usage of the iterations. It is noted that although in FIG. 1, scheduled jobs are illustrated in the context of execution hosts of a virtualized computing service 120, in other embodiments scheduled batch jobs may be implemented at platforms of other services as well, such as at storage nodes of a storage service or at network nodes of a networking-related service.

Effects of Temporal Distribution of Batch Jobs on Applications

Figure 2:
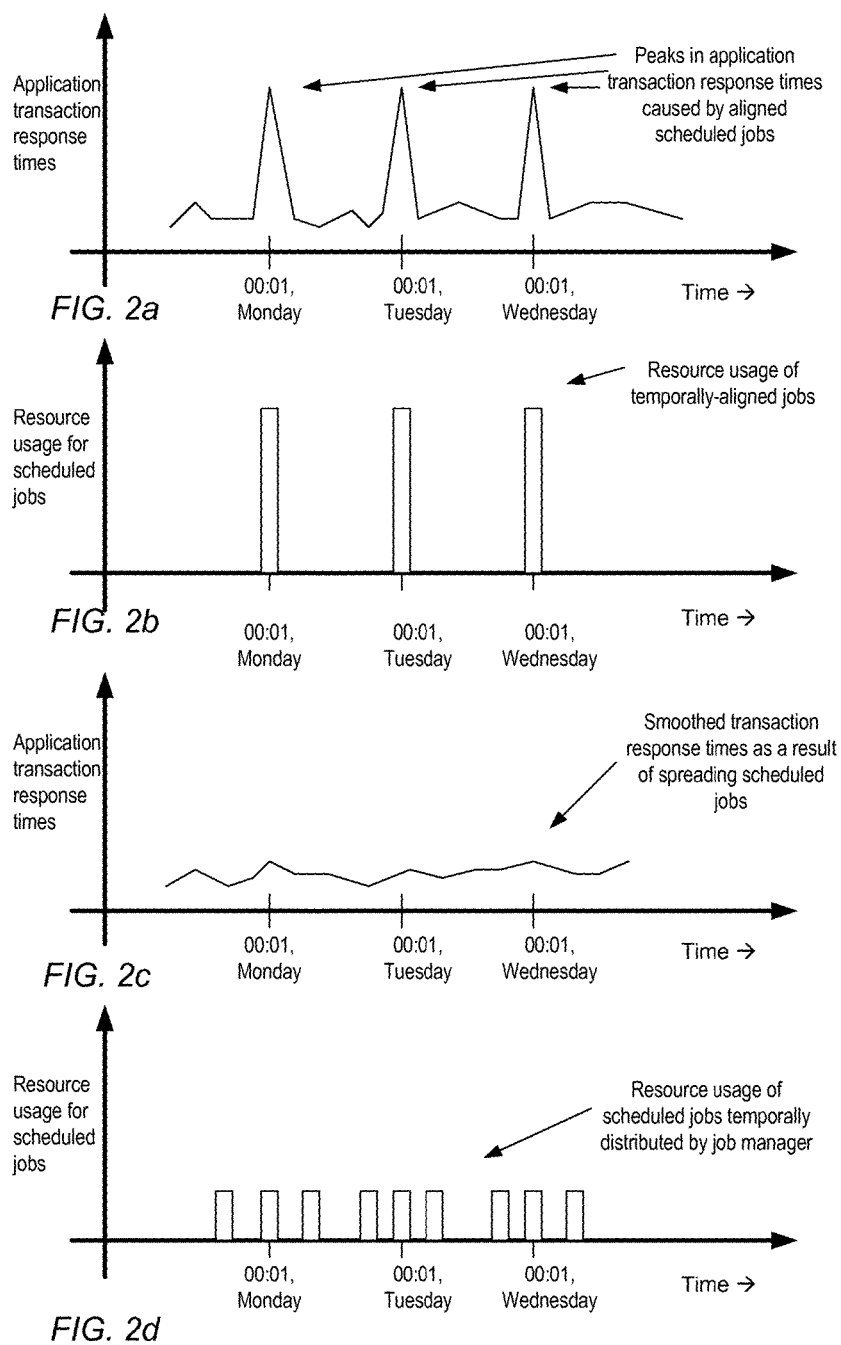
FIG. 2a-FIG. 2d collectively illustrate an example of how application transaction response times may be smoothed by temporally distributing batch job executions, according to at least some embodiments.

FIG. 2a-FIG. 2d collectively illustrate an example of how application transaction response times may be smoothed by temporally distributing batch job executions, according to at least some embodiments. These figures are intended to provide a high-level conceptual overview of how the scheduling of batch jobs may impact applications, rather than specific details of any given application or any given set of jobs. FIG. 2a shows a pattern of transaction response times that may be observed for a given application over the course of several days of a week, in an environment in which a number of batch jobs are scheduled at approximately the same time every day (00:01 AM, or one minute after midnight). In FIG. 2a, the application transaction response time curve shows substantial peaks centered at around 00:01 AM on Monday, 00:01 AM on Tuesday, and 00:01 AM on Wednesday.

One possible reason for the response time peaks is shown in FIG. 2b, which indicates the utilization level of a particular resource shared by the application and by the temporally aligned batch jobs. Only the resource usage levels caused by the batch jobs is shown. In the depicted example, the batch jobs are relatively short in duration (or at least their impact on the shared resource is fairly short in duration), but the combined and concentrated effect of the coinciding job executions on the resource is such that it may well have led to the spikes shown in FIG. 2a.

FIG. 2c and FIG. 2d show the impact of distributing the executions of the batch jobs temporally, e.g., by a job manager 180 using some of the techniques described above. The total utilization level of the shared resource that is attributable to the batch jobs during any given short window of time falls as a result of spreading the start times of the jobs, as shown in FIG. 2d. Accordingly, the impact of the batch jobs on the application response times also falls, as indicated in FIG. 2c. As indicated by the combination of FIG. 2a-2d, actions taken by the job service to distribute job executions may be able to substantially reduce the variation seen in application performance in at least some embodiments.

Example Interfaces Used for Job Specification and Configuration

Figure 3:
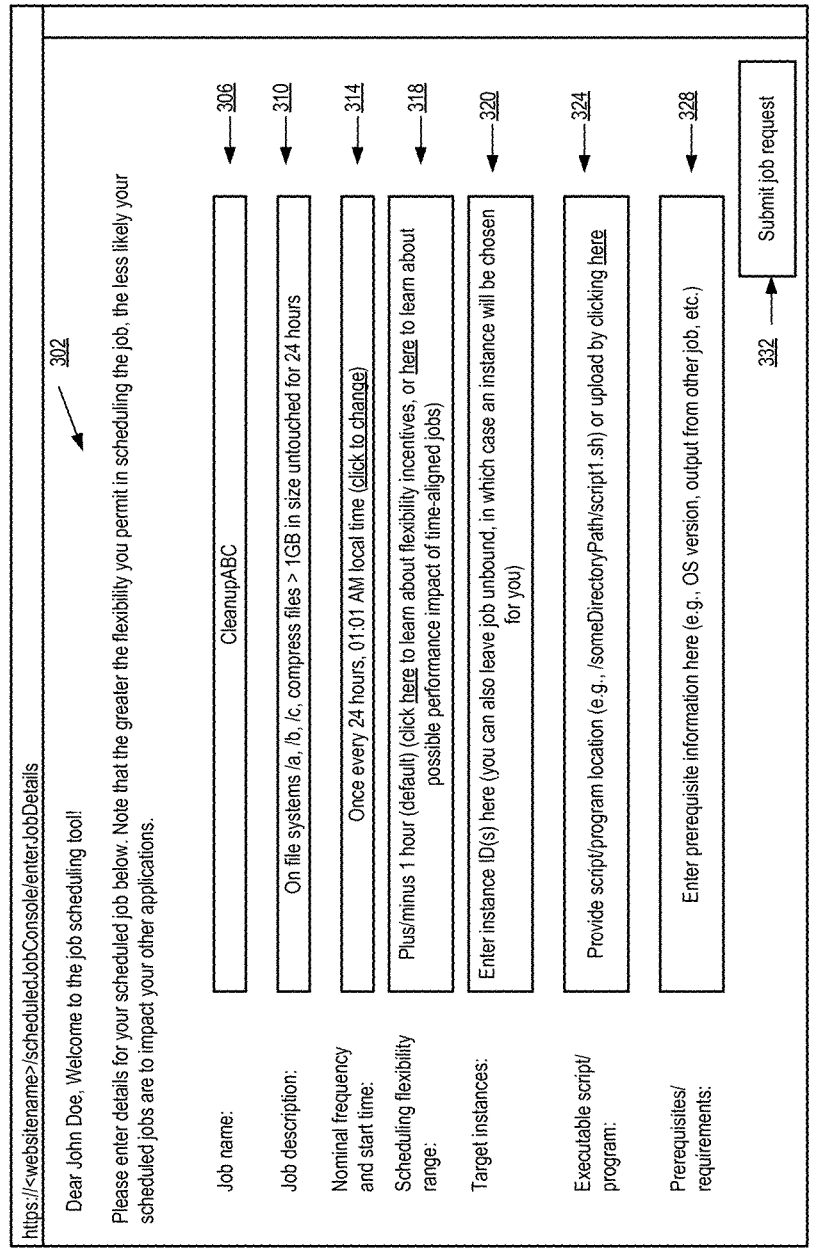
FIG. 3 illustrates an example of a programmatic interface that enables clients to indicate flexibility ranges for scheduling batch jobs, according to at least some embodiments.

FIG. 3 illustrates an example of a programmatic interface that enables clients to indicate flexibility ranges for scheduling batch jobs, according to at least some embodiments. As shown, FIG. 3 includes a web page 300 that includes a message area 302 as well as several different form fields that may be filled out by clients 170.

The message area 302 may include a suggestion or hint indicating that it would be beneficial to allow flexibility in the scheduling of the job being submitted. Using fields 306 and 310 respectively, a client may specify a name and a brief description for the job. In some embodiments, the description field (or some other similar field) may be used by the client to indicate resource usage characteristics of the job that may be helpful in scheduling job iterations—e.g., whether the job is compute-intensive or not, I/O-intensive or not, and so on. A nominal frequency and nominal start times at which the iterations of the job are to be executed may be specified using field 314. The nominal start time and the nominal frequency may indicate default values to be used if the job manager 180 determines that there is no need to change the start time of a job iteration (e.g., because no other jobs, or only a few other jobs, are scheduled for the same nominal start time, or if few or no resources can be identified for which contention may arise due to the scheduling of the job at that nominal start time). In the example shown, the job is to be executed once a day, with a nominal start time of 1:01 AM each day. Clients may use the "click to change" link to modify the nominal frequency and start time in the depicted example interface. In at least some embodiments, nominal start times need not be specified by clients; e.g., a client may simply indicate that a job iteration should be performed once a week on average, and leave the timing of the iterations entirely up to the service.

A scheduling flexibility time range may be specified by the client using field 318 in the depicted embodiment. For example, a client may specify that any start time within a time window of two hours (the default value shown in FIG. 3) centered around the nominal start time is acceptable. In the depicted embodiment, links are provided in form field 318 to enable the client to view two additional pieces of information. The job scheduling service may have implemented incentives, in the form of discounts or coupons, that are intended to encourage clients to allow greater flexibility in batch job scheduling, and one of the links included in field 318 may lead to a display of any applicable incentives. Another link included in field 318 may provide an explanation of why allowing greater flexibility may lead to better performance, and a corresponding recommendation to increase the time range associated with the job. This additional information may be similar in principle to the type of information shown in FIG. 2a-FIG. 2d. At least in some embodiments the explanation/recommendation may be personalized to show the possible impact of the batch jobs on specific applications of interest to, or running on behalf of, the client, which may make it more likely that the client increases the flexibility granted to the service.

A "Target Instances" form field 320 may be provided to enable clients to specify the specific instances or execution platforms at which the job is to be executed. In some embodiments, such a specification of instances may be required, while in other embodiments or depending on the nature of the job, a target execution need not be specified, and the job may be designated as unbound, with the selection of the execution platform for any given iteration being left to the job scheduling service.

An executable script or program may be specified or uploaded using form field 324 or the upload link located therein in the depicted example interface. Prerequisites and requirements that have to be met in order for the job to be executed successfully, such as a particular operating system version or some combination of installed programs at the target execution platform, or the successful receipt of output from some other job, may be indicated via field 328 in the depicted example. The job details may be submitted to the scheduling service by clicking on button 332 in the embodiment shown in FIG. 3. It is noted that drop-down menu choices and/or context-sensitive options may be provided for various fields of the web page in different embodiments. Not all the form fields shown in FIG. 3 need be included in all implementations, and other fields for additional job descriptor contents may be supported in some implementations. For example, in one embodiment, the target instance may already be determined before the client reaches the job descriptor entry page (e.g., the job descriptor entry page may be reached from an instance-specific page). Other types of interfaces, such as APIs or custom GUIs, in addition to or instead of the web-based interface shown in FIG. 3, may be implemented in some embodiments to allow clients to provide similar kinds of information to the service regarding their batch jobs.

In many cases, a given client may have dozens, hundreds or even thousands of compute instances allocated within the provider network, and several different batch jobs may be scheduled for execution on each instance. Tools that provide only a per-instance view of the batch jobs may be cumbersome and inefficient for those clients that wish to manage jobs spread across large numbers of instances. To allow clients to obtain a more complete picture of their scheduled jobs, a consolidated view may be provided by the scheduling service in some embodiments. FIG. 4 illustrates an example of a programmatic interface providing a client with a consolidated view of batch jobs that may be scheduled at any of a plurality of execution platforms of a provider network, according to at least some embodiments. As shown, the interface may include a web page 400, with a message area 402 and a combined list of the client's jobs that may be filtered based on various client-specified criteria (e.g., by clicking on the filter link indicated in the message area, the client may be able to specify criteria for selecting or ordering the subset of jobs displayed). In the depicted example, the message area 402 also includes a link to a web page (similar to the web page 300 of FIG. 3) that may be used by the client to enter details of a new job.

As indicated by the list headers 406, numerous characteristics of the client's jobs may be displayed in the consolidated list view. The displayed properties in the depicted example include the job name, the job description, the target instance at which the job is to be executed, the nominal frequency of the job iterations, the nominal next start time, the scheduled actual next start time (which may differ from the nominal next start time because of a load distribution policy-based rescheduling decision made by the service), a result of the most recent iteration of the job, a link to the output produced by the most recent iteration, and a link to view additional details of the job descriptor. As noted earlier, in some embodiments the job scheduling service may specify actual start times at sub-second granularity. In some implementations, even the nominal start times may be specified by clients at sub-second granularity, or at least displayed at sub-second granularity as shown in FIG. 4, even if the client did not specify the nominal start time at sub-second granularity. Thus, for example, for the "Rotate WSLog" job of list entry 410 in the example list, the next iteration's actual start time is shown as 13:37:01.520 (1 second and 520 milliseconds after 13:37). In some embodiments, resources of the provider network may be organized into a hierarchy that may include geographical regions, data centers within geographical regions, and/or fault-isolation containers called "availability zones". The target instances for the jobs of list entries 410 and 414 in FIG. 4 are specified using both an instance identifier and an availability zone identifier; in other implementations, region names/identifiers and/or data center names/identifiers may also be provided.

As shown in list entries 410, 414, and 418, the scheduled start times for the next iterations of at least some jobs may differ from the nominal start times as a result of the job manager's temporal load distribution efforts. Clients may be able to request modifications to the next scheduled start times (e.g., by narrowing the flexible time ranges associated with the jobs, or by requesting a one-time rescheduling) via the consolidated view in at least some embodiments.

The consolidated job list view may display both bound jobs (i.e., jobs for which the client has indicated the target execution platform) and unbound jobs (for which the service is responsible for selecting the execution platform for each iteration, as per the requirements/prerequisites specified by the client). For example, in FIG. 4, jobs associated with entries 410 and 414 are bound, while the job associated with entry 418 is unbound. In various implementations, different combinations of fields may be included in the consolidated list view than are shown in FIG. 4. Other types of interfaces, such as APIs or custom GUIs, in addition to or instead of the web-based interface shown in FIG. 4, may be usable to display consolidated job lists in some embodiments. It is noted that in embodiments in which execution platforms include VMSSs, administrators of the virtualization hosts of the provider network may also be able to use programmatic interfaces similar to those described above that may be used by clients of the virtualization service.

Methods for a Flexible Job Scheduling Service

Figure 5:
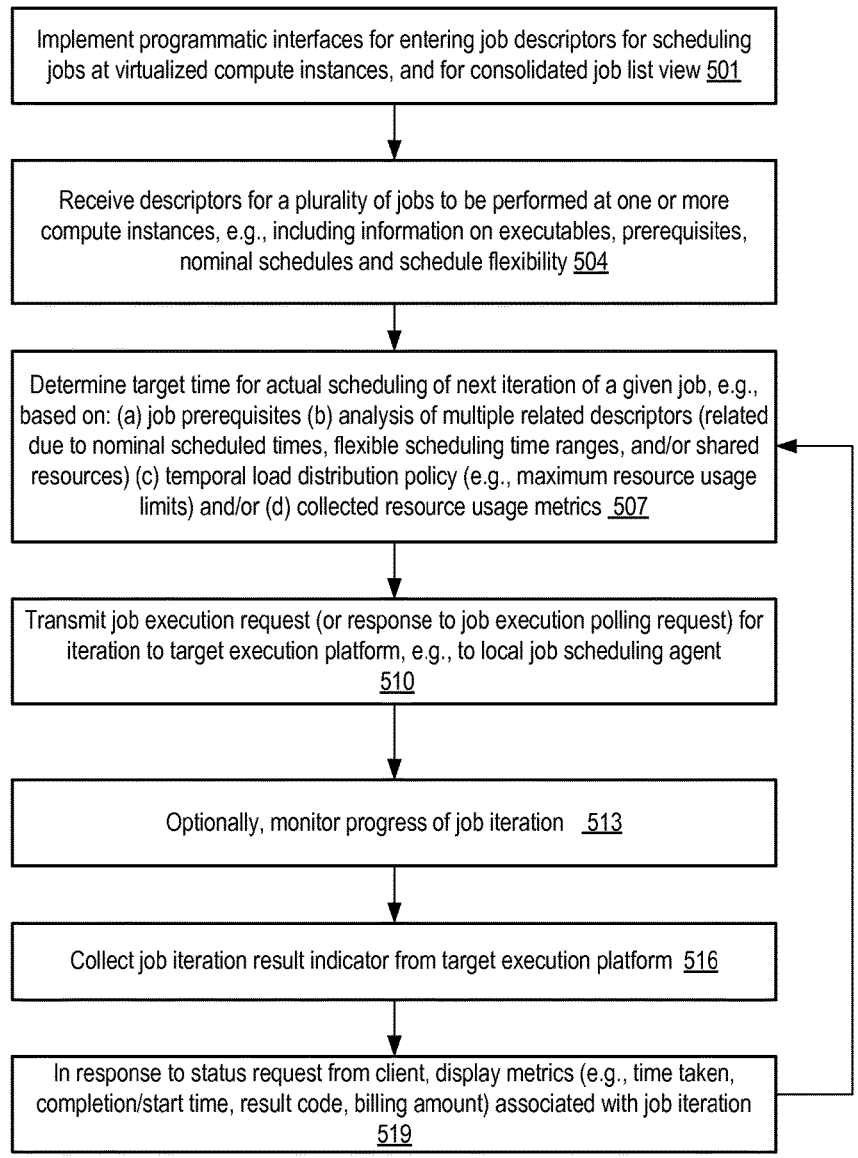
FIG. 5 is a flow diagram illustrating aspects of operations that may be performed to implement a centralized batch job scheduling service in a provider network, according to at least some embodiments.

FIG. 5 is a flow diagram illustrating aspects of operations that may be performed to implement a centralized batch job scheduling service in a provider network, according to at least some embodiments. As shown in element 501, one or more programmatic interfaces may be implemented to enable clients to submit job descriptors comprising characteristics and/or requirements for batch jobs to be scheduled at execution platforms such as compute instances. The job descriptors may include, for example, indications of the executable programs to be run, nominal iteration frequencies and start times, and/or flexible time ranges for scheduling job iterations. The programmatic interfaces may include consolidated job list views in at least some embodiments. Any combination of one or more types of programmatic interfaces may be implemented, including for example web pages/web sites, APIs, custom GUIs, or command-line tools. It is noted that clients of the job scheduling service may include administrators of various services implemented within the provider network, as well as external clients that utilize various services implemented within the provider network.

Job descriptors for a plurality of jobs may be received via one or more of the interfaces (element 504). In some embodiments, job descriptors may also or instead be generated on the basis of client-created entries in local job lists (e.g., files similar to crontab files) at the execution platforms themselves. The service may determine the target start time for the next iteration of a given job (element 507) based on any combination of various factors such as (a) the specified prerequisites for the job, if any, (b) an analysis of multiple related descriptors (descriptors related by the closeness of their nominal iteration start times, by their flexible scheduling time ranges, and/or by the use of shared resources for the corresponding jobs) (c) a temporal load distribution policy (e.g., a policy indicating the maximum targeted utilization limits of various key resources such as CPUs, disks, memory and the like) and/or (d) collected resource usage metrics. For example, in one embodiment, the service may examine, as a group, a collection of jobs targeted for execution (based on nominal execution times) within the next 12 hours at all the instances and at the VMSS of a given virtualization host. Each of the jobs of such a group may be expected to use at least some resources of the given virtualization host, such as its CPUs or cores, its memory, its storage devices, or the VMSS itself. As such, overlapping job execution periods may lead to resource contention that could impact the performance of the jobs, as well as the performance of other applications running at the virtualization host. In at least some embodiments, when determining target start times, the service may also take into account the expected application workload (as opposed to the scheduled job workload) at the execution platforms. In at least one implementation, clients may be able to specify a set of jobs whose start times are to be determined based on analyzing the jobs' requirements as a group.—that is, clients may delineate the grouping of jobs for scheduling purposes.

A job execution request comprising the target time may be transmitted to the execution platform at which the iteration is to be run (element 510), e.g., to a job scheduling agent at the targeted execution platform. The request may be sent over a long-lasting secure connection established between the job scheduling agent and a job manager of the scheduling service in some implementations; such connections may be reused for multiple job-related interactions, thereby amortizing the overhead associated with connection establishment and termination. In at least some embodiments, an indication of a target time for an iteration may be provided in response to a job execution polling request or query initiated by the job scheduling agent. In some embodiments the job execution request may be sent some time before the job iteration is to start, and the job scheduling agent may store the requests in a buffer or a queue (or in a local job list) until the target start time is reached. In other embodiments, job execution requests may be sent for immediate action by the job scheduling agents, e.g., the agents may be expected to initiate the job iterations as soon as the job execution requests are received. The executable program(s) of the job may be invoked or started at the execution platform. In some implementations, the progress of the running iteration may optionally be monitored (element 513), e.g., by analyzing its log files, error files and/or output files. A result indicator (e.g., a return code of the program or script, or a portion of output generated by the program or script) and/or other metrics associated with the iteration may be collected (element 516). In response to a status request from a client, one or more metrics and/or the result indicator may be provided to the client (element 519), including for example the result indicator, the actual start and stop times, measurements of resources used, billing amounts (which may be determined for example by a billing component of the job manager based on the actual resource usage of the iteration), and so on. It is noted that at least in some embodiments in which a consolidated list view of jobs is provided (similar to that shown in FIG. 4, for example), a request to view the job list may be interpreted as a status request for each of the jobs to be included in the list—i.e., no additional status request may be required other than a request to view the job list. Operations corresponding to elements 507 onwards may be repeated for each of the job iterations requested by clients in the depicted embodiment.

Figure 6:
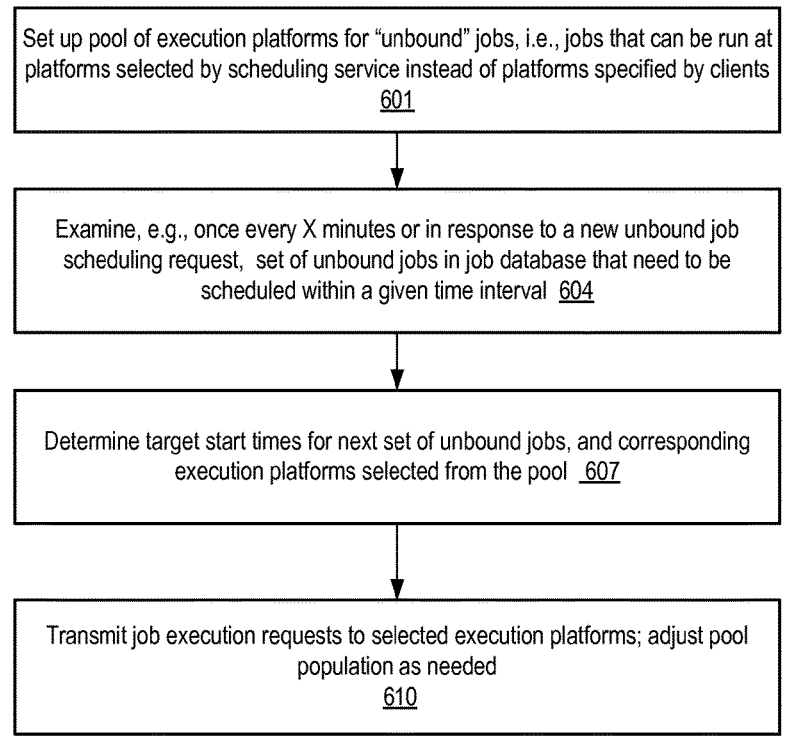
FIG. 6 is a flow diagram illustrating aspects of operations that may be performed to support scheduling of jobs for which execution platforms may be selected by the service, according to at least some embodiments.

As described above, in at least some embodiments, not all the jobs scheduled by the service may have to be run on execution platforms that have been explicitly specified by the clients. Instead of specifying the target execution platform, clients may specify the job requirements (including for example nominal scheduling requirements and scheduling flexibility levels), any prerequisites, as well as the executable programs or scripts to be run. The information on unbound jobs may be stored within a job service database in at least some embodiments. FIG. 6 is a flow diagram illustrating aspects of operations that may be performed to support scheduling of jobs for which execution platforms may be selected by the service, according to at least some embodiments. As shown in element 601, a pool of execution platforms such as compute instances may be set up for handling such unbound jobs in some embodiments. The pool may comprise instances that use different operating systems or operating system versions in at least some implementations, so that unbound jobs with a variety of different operating system requirements or prerequisites may be executed using the pool, without the service having to spin up a new instance for every unbound job.

As shown in element 604, a set of unbound jobs that need to be scheduled within a given time interval may be examined periodically, or in response to triggering events such as the submission of a new unbound job scheduling request. In some embodiments, related bound and unbound jobs (e.g., jobs of both types that have similar requirements or similar scheduling constraints) may be examined together for determining target start times. The target start times for the next set of unbound jobs may then be determined, together with the target execution platforms selected from the pool. (element 607). Job execution requests may be sent to the selected execution platforms (element 610), e.g., to job scheduling agents instantiated at the platforms. Depending on the demand for various kinds of unbound jobs, in at least some embodiments the pool size may be adjusted from time to time.

Figure 7:
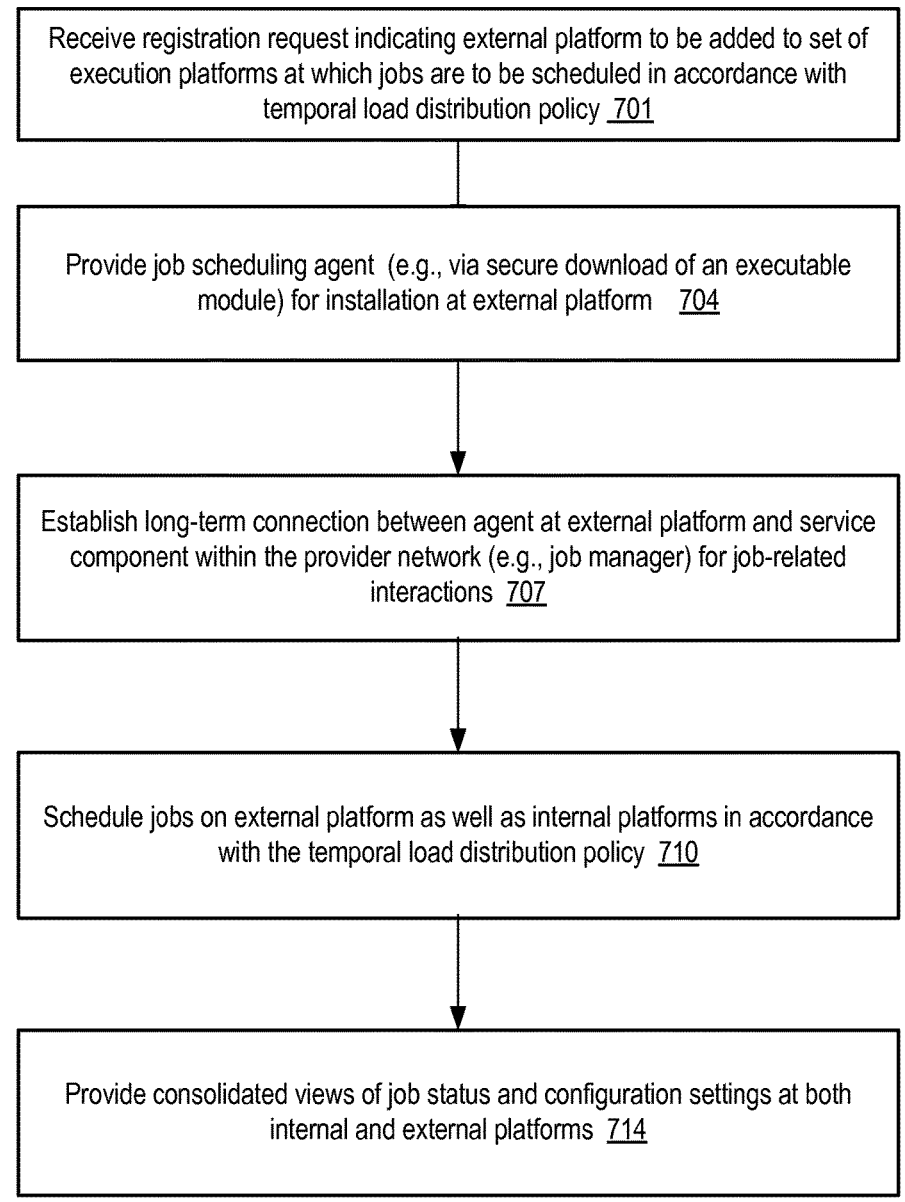
FIG. 7 is a flow diagram illustrating aspects of operations that may be performed to enable registration of resources external to a provider network as potential execution platforms for jobs scheduled by a job scheduling service, according to at least some embodiments.

As mentioned above, in some embodiments the job scheduling service may be usable to manage batch jobs executed at platforms outside the provider network, e.g., within client data centers or third party locations. In such embodiments, clients may be able to take advantage of the unified, consolidated view provided by the service's interfaces to configure and monitor all of their jobs, regardless of where they are scheduled. In some cases, for unbound jobs, execution platforms may be selected in one embodiment either from the provider network's facilities, or from the external locations that have registered platforms capable of implementing the unbound jobs. FIG. 7 is a flow diagram illustrating aspects of operations that may be performed to enable registration of resources external to a provider network as potential execution platforms for jobs scheduled by a job scheduling service, according to at least some embodiments. As shown in element 701, a registration request may be received by the service, indicating an external platform outside the provider network (such as a physical or virtual machine located at client-owned premises) at which jobs are to be scheduled by the service, e.g., in accordance with a temporal load balancing policy. The registration request may be received via one of the programmatic interfaces 186 implemented by the service in some embodiments. In some embodiments, a list of external platforms may be provided in a single registration request. The network names and addresses for the external platforms may be provided in some embodiments.

In order for the service to be able to schedule jobs at the external platforms, the installation of job scheduling agents compatible with the service may be required at the external platforms in at least some embodiments. Accordingly, in the depicted embodiment, the agent (e.g., in the form of executable modules appropriate for the operating systems in use at the external platforms) may be provided for downloading and installation (element 704). After the job scheduling agent is installed at a given external platform, a long-lived connection (e.g., using a secure protocol similar to the secure sockets layer (SSL) or transport layer security (TLS) protocols) may be established between the agent and a job manager within the provider network (element 707). In some embodiments, the connection establishment may be initiated from the agent, while in other embodiments, the job manager may initiate the connection.

After the connection is established, the external platform may be added to the set of platforms at which jobs are scheduled and monitored (element 710), e.g., using techniques similar to those described earlier for either bound jobs, unbound jobs, or both bound and unbound jobs. The set of job descriptors considered as a group for scheduling decisions may, for example, include some descriptors of jobs targeted for execution at client facilities and other descriptors of jobs targeted for execution at the provider network data centers in at least some embodiments. A consolidated view of the job status and configuration information for both the internal and external platforms may be provided to clients, e.g., via a web-based console similar to that shown in FIG. 4.

It is noted that a number of variations of the techniques illustrated in FIG. 7 may be implemented in different embodiments. For example, in one embodiment, a client may wish to view the combined internal and external job information, but may not wish to allow the service to start jobs or perform any modifications at the external (e.g., client-premise) platforms for security or other reasons. In such a scenario, the agent installed at the external resource may be configured in a read-only mode, in which the agent supplies the job scheduling service with job-related information it can obtain (such as crontab entries) from the external platform, but does not initiate any job iterations. The job-related information collected by the read-only agent may be incorporated within the consolidated job list view by the service, and presented to the client via the web-based console or other interfaces. In another variation, the agent may be permitted by the client in one embodiment to initiate some classes of jobs (e.g., bound jobs that are requested by the client) at the external resources, but not other classes of jobs (e.g., unbound jobs).

Figure 8:
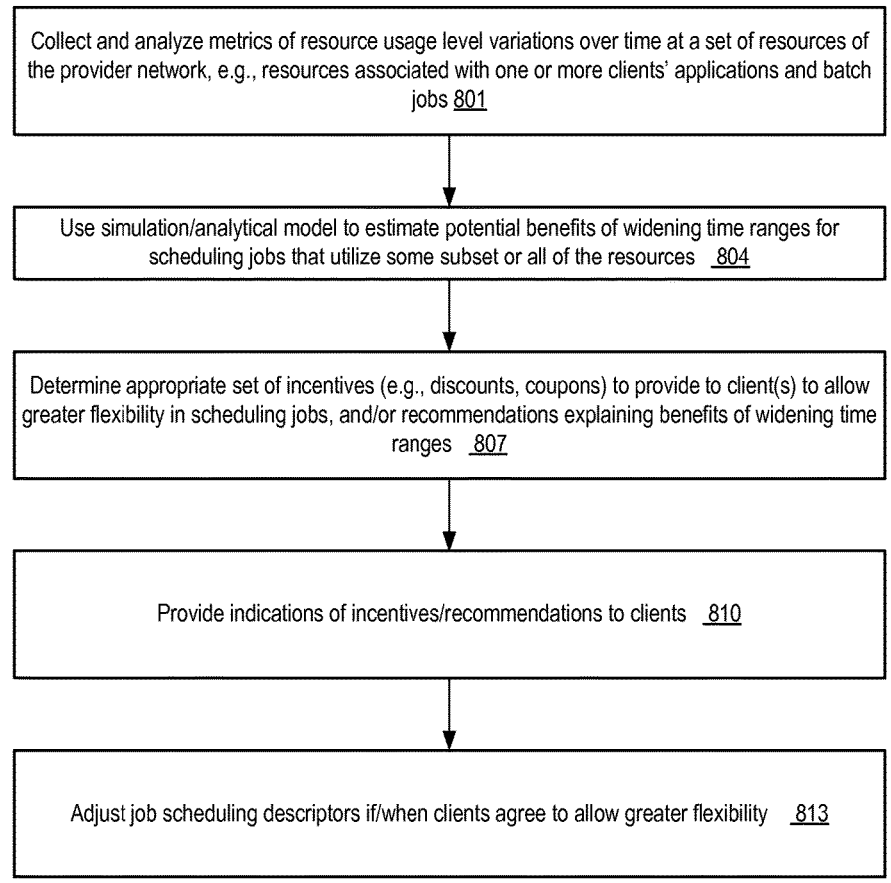
FIG. 8 is a flow diagram illustrating aspects of operations that may be performed to determine incentives that may be offered to clients to allow flexible scheduling of their jobs, and re-instantiate the resources within the provider network, according to at least some embodiments.

In some embodiments, the job scheduling service may offer inducements to clients in an effort to convince the clients to allow greater flexibility in job scheduling. FIG. 8 is a flow diagram illustrating aspects of operations that may be performed to determine incentives that may be offered to clients to allow flexible scheduling of their jobs, according to at least some embodiments. As shown in element 801, the service may collect and analyze metrics of resource utilization levels over time at various provider network resources, e.g., at resources accessed by or used by various client applications and batch jobs. A tool, such as an analytical or simulation model, may be used to estimate the potential benefits of widening the time ranges over which various batch jobs can be scheduled (element 804). Relatively simple spreadsheet-level models may be used in some implementations, and more sophisticated mathematics may be used in other implementations for implementing the model.

A set of incentives may be determined (element 807), such as one-time or long-term discounts or coupons that can be provided to clients to offset their billing amounts for the use of various services of the provider network in exchange for allowing greater flexibility in batch job scheduling. In at least some implementations, respective incentives may be determined for each of several flexible time range options for scheduling the job iterations. In some embodiments, independently of whether monetary or billing-related incentives are provided, flexibility recommendations may be provided to clients, e.g., indicating the possible performance impact of their jobs on one or more of client applications and/or the benefits of widening time ranges for scheduling the jobs. Indications of the incentives/recommendations may be provided to the clients (element 810), e.g., via the programmatic interfaces of the service (see, for example, the links illustrated in element 318 of FIG. 3), or via other communication mechanisms such as e-mail messages or as part of the clients' invoices. If a client is willing to increase the flexibility for scheduling their jobs, the corresponding job descriptors may be modified accordingly (element 813), and the scheduling service may adjust start times for the modified jobs based on the level of additional flexibility the client indicates. It is noted that at least in some embodiments, different clients may be offered different incentives, based for example on the total estimated impact of their jobs. In at least some embodiments, the capability of using the job scheduling service may be pre-built or pre-configured as a default into at least some of the virtual machine images (e.g., a set of "standard" images) made available for compute instances by a provider network operator. In such embodiments, no additional steps need be taken by clients to use the job scheduling service, and no special incentives or recommendations may be needed.

It is noted that in various embodiments, operations other than those illustrated in the flow diagrams of FIGS. 5, 6, 7, and 8 may be implemented to implement the job scheduling service functionality, and that some of the operations shown may not be implemented, or may be implemented in a different order, or in parallel rather than sequentially.

Use Cases

The techniques described above, of changing the schedules of batch jobs in an effort to distribute the workload of the jobs along the time dimension may be beneficial in a number of scenarios. For example, in large provider networks, virtualization hosts may comprise numerous compute instances, at each of which numerous batch jobs may typically be scheduled. All of the batch jobs at a host may consume at least the processing resources (e.g., physical CPUs or cores) of the host, and often other shared resources such as network bandwidth as well. In addition, the administrative or control plane features of various services of the provider network may also involve the use of large numbers of batch jobs (e.g., jobs run at the virtualization management software stacks of the virtualization hosts), such as various types of service health-monitoring jobs, many of which may also involve the use of resources shared with applications and client-specified batch jobs.

Collectively, all these batch jobs may have a significant impact on each other and/or on other applications, depending on the manner in which their schedules are specified. In many cases, the execution times of various batch jobs may coincide primarily by accident rather than primarily by design, as there may not be any real reason for scheduling many of them at exactly the times that they are scheduled instead of at slightly different times. Even if the users or clients that request these batch jobs try to spread them out over time, in some embodiments the scheduling tools available may only allow start times to be expressed at a coarse granularity, such as at minute boundaries, which may still lead to more execution-time overlap than necessary, given the large number of jobs to be scheduled. A job service that enables clients to allow flexibility in batch scheduling, and even provided incentives based on the extent of flexibility clients are willing to accept, may help reduce the impact of the batch jobs substantially.

In addition, for large clients or for provider network service administrators with large resource fleets to manage, the ability to view batch job information and status using a unified consolidated interface may help simplify the task of managing batch jobs. A scheduling service that also supports unbound jobs, in which the selection of execution platforms for jobs is left up to the service and in which the requesters of the unbound jobs are billed only for the resource actually consumed, may substantially reduce the costs of relatively short jobs for many clients. For example, instead of incurring the costs of starting up (and tearing down) a new compute instance, a client may only be charged for the few minutes' or seconds' worth of CPU time it takes to complete a given job iteration.

Illustrative Computer System

Figure 9:
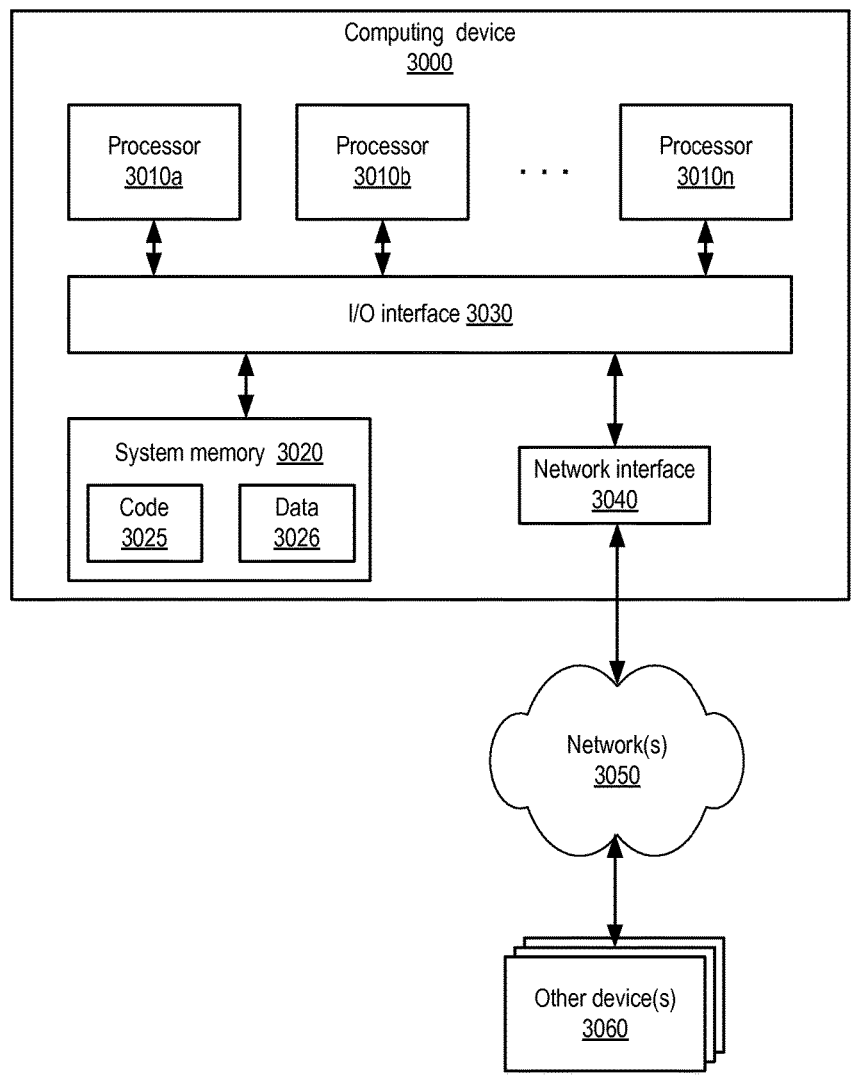
FIG. 9 is a block diagram illustrating an example computing device that may be used in at least some embodiments.

In at least some embodiments, a server that implements a portion or all of one or more of the technologies described herein, including the techniques to implement job managers, job scheduling agents and/or related components such as job service databases, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more respective hardware processors and memory and configured to:
implement one or more programmatic interfaces enabling clients of a job scheduling service of a provider network to indicate respective scheduling descriptors associated with a plurality of jobs, the provider network configured to perform the plurality of jobs on behalf of the clients;
receive, from a particular client and via the one or more programmatic interfaces, a particular scheduling descriptor associated with a particular job, wherein the particular job indicates one or more executable programs or scripts whose execution is dependent on at least in part on use of a shared resource, and wherein the particular scheduling descriptor comprises at least one scheduling flexibility parameter indicating one or more desired execution times for the particular job;
determine a target time to initiate an execution of the particular job, based at least in part on an analysis of (a) a plurality of scheduling descriptors corresponding to a set of jobs including the particular job, whose executions contend for use of the shared resource, (b) a temporal load distribution policy, and (c) at least two scheduling flexibility parameters in scheduling descriptors of different jobs in the set of jobs, wherein the at least two scheduling flexibility parameters specify different desired execution times;
transmit a job execution request indicating the target time to a selected execution platform;
perform one or more executable operations at the selected execution platform in accordance with the job execution request;
collect a result indicator of the iteration of the particular job from the selected execution platform; and
in response to a job status request from the particular client, display one or more metrics associated with the iteration of the particular job.

2. The system as recited in claim 1, wherein the one or more computing devices are further configured to:
receive, from the particular client, the one or more executable programs or scripts to be invoked to perform the one or more executable operations, and a representation of a set of prerequisites for the iteration of the particular job;
store the one or more executable programs or scripts and the set of prerequisites within a repository implemented at least in part within the provider network; and
select, based at least in part on the set of prerequisites, at least one of (a) the execution platform to which the job execution request is sent, (b) the target time, or (c) the target time.

3. The system as recited in claim 1, wherein the shared resource comprises a processing element at a virtualization host of a virtualized computing service of the provider network, wherein the virtualization host comprises a plurality of compute instances including a first compute instance allocated to the particular client and a second compute instance allocated to a different client, and wherein the selected execution platform comprises the first compute instance.

4. The system as recited in claim 1, wherein the target time is indicated in the job execution request at a sub-second granularity.

5. The system as recited in claim 1, wherein the one or more metrics include one or more of: (a) a billing amount associated with the iteration, (b) an execution duration of the iteration, or (c) one or more measurements of resource usage associated with the iteration.

6. The system as recited in claim 1, wherein the at least one scheduling flexibility parameter comprises at least one of:
a time range during which at least part of an iteration of the particular job is to be executed on behalf of a particular client; or
an indication of a desired approximate frequency of execution of the particular job.

7. The system as recited in claim 1, further comprising receiving a request to revise the target time from the particular client, wherein the request to revise the target time comprises at least one of:
a modification of the at least one scheduling flexibility parameter; or
a request to reschedule at least one particular iteration of the particular job to a specified time.

8. A method, comprising:
performing, by a plurality of computing devices:
implementing one or more programmatic interfaces enabling clients of a job scheduling service supported by a provider network to indicate respective descriptors associated with a plurality of jobs, wherein the provider network is configured to perform the plurality of jobs on behalf of the clients, wherein a particular descriptor associated with a particular job, wherein the particular job indicates one or more executable programs or scripts whose execution is dependent on at least in part on use of a shared resource, and wherein the particular descriptor comprises at least one scheduling flexibility parameter indicating one or more desired execution times for the particular job;
determining a target time to initiate an execution of the particular job, based at least in part on an analysis of a plurality of descriptors obtained from a plurality of clients, wherein the plurality of descriptors corresponding to a set of jobs, including the particular job, whose executions contend for the shared resource, and at least two scheduling flexibility parameters in the plurality of descriptors, including the scheduling flexibility parameter, that specify different desired execution times;
transmitting a job execution request indicating the target time to a selected execution platform; and
providing an indication of one or more metrics associated with the iteration to the particular client, including a result indicator of the iteration.

9. The method as recited in claim 8, further comprising performing, by the one or more computing devices:
receiving, from the particular client, the one or more executable programs or scripts to be invoked to perform the iteration of the particular job, and a representation of a set of prerequisites for the iteration;

storing the one or more executable programs or scripts and the set of prerequisites within a repository implemented at least in part within the provider network; and selecting, based at least in part on the set of prerequisites, at least one of: (a) the execution platform to which the job execution request is transmitted, (b) the target time, or (c) the target time.

10. The method as recited in claim 9, wherein a particular prerequisite of the set of prerequisites comprises a completion of an operation at a resource of the provider network.

11. The method as recited in claim 8, further comprising performing, by the one or more computing devices:

selecting the plurality of descriptors to be analyzed to determine the target time based at least in part on a determination that jobs indicated in the plurality of descriptors require access to a shared resource.

12. The method as recited in claim 11, wherein the shared resource comprises at least one component of a virtualization host of a virtualized computing service of the provider network.

13. The method as recited in claim 12, wherein the virtualization host comprises a plurality of compute instances including a first compute instance allocated to the particular client and a second compute instance allocated to a different client, and wherein the selected execution platform comprises the first compute instance.

14. The method as recited in claim 12, wherein the selected execution platform comprises a module of a virtualization management software stack at the virtualization host.

15. The method as recited in claim 11, wherein the shared resource comprises at least one of: (a) a database object implemented at a database service of the provider network, (b) a network resource of the provider network, or (c) a storage object implemented at a storage service of the provider network.

16. The method as recited in claim 8, wherein the target time is determined based at least in part on a temporal load distribution policy which includes an indication of a target maximum resource utilization level for a resource utilized during the iteration.

17. A non-transitory computer-accessible storage medium storing program instructions that when executed on one or more processors:

receive, via a programmatic interface, a representation of a descriptor associated with a particular job requested by a particular client of a provider network job scheduling service, wherein the provider network is configured to perform the particular job on behalf of the particular client, wherein the particular job indicates one or more executable programs or scripts whose execution is dependent on at least in part on use of a shared resource, and wherein the descriptor comprises an indication of a time range during which at least part of an iteration of the particular job is to be executed on behalf of the particular client;

determine a target time to initiate an execution of the iteration of the particular job, based at least in part on an analysis of a plurality of descriptors corresponding to respective jobs whose executions contend for the shared resource and at least two indications of different times ranges in the plurality of descriptors for executing at least two of the respective jobs, including the indicated time range; and provide an indication of the target time to a selected execution platform.

18. The non-transitory computer-accessible storage medium as recited in claim 17, wherein the selected execution platform comprises a resource located outside the provider network.

19. The non-transitory computer-accessible storage medium as recited in claim 17, wherein the selected execution platform comprises a resource at a client facility.

20. The non-transitory computer-accessible storage medium as recited in claim 19, wherein the plurality of descriptors comprises at least one descriptor of another job targeted for execution at the client facility.

21. The non-transitory computer-accessible storage medium as recited in claim 17, wherein the instructions when executed on the one or more processors:

provide, via another programmatic interface, an indication to the particular client of an incentive associated with a time range option of a plurality of time range options available for iterations of the particular job.

22. The non-transitory computer-accessible storage medium as recited in claim 17, wherein the instructions when executed on the one or more processors:

provide, via another programmatic interface, a recommendation to the particular client to expand the time range associated with the iteration, wherein the recommendation comprises an indication of a potential performance impact of the iteration on an application being executed on behalf of the client.

* * * * *